United States Patent Office 3,142,644
Patented July 28, 1964

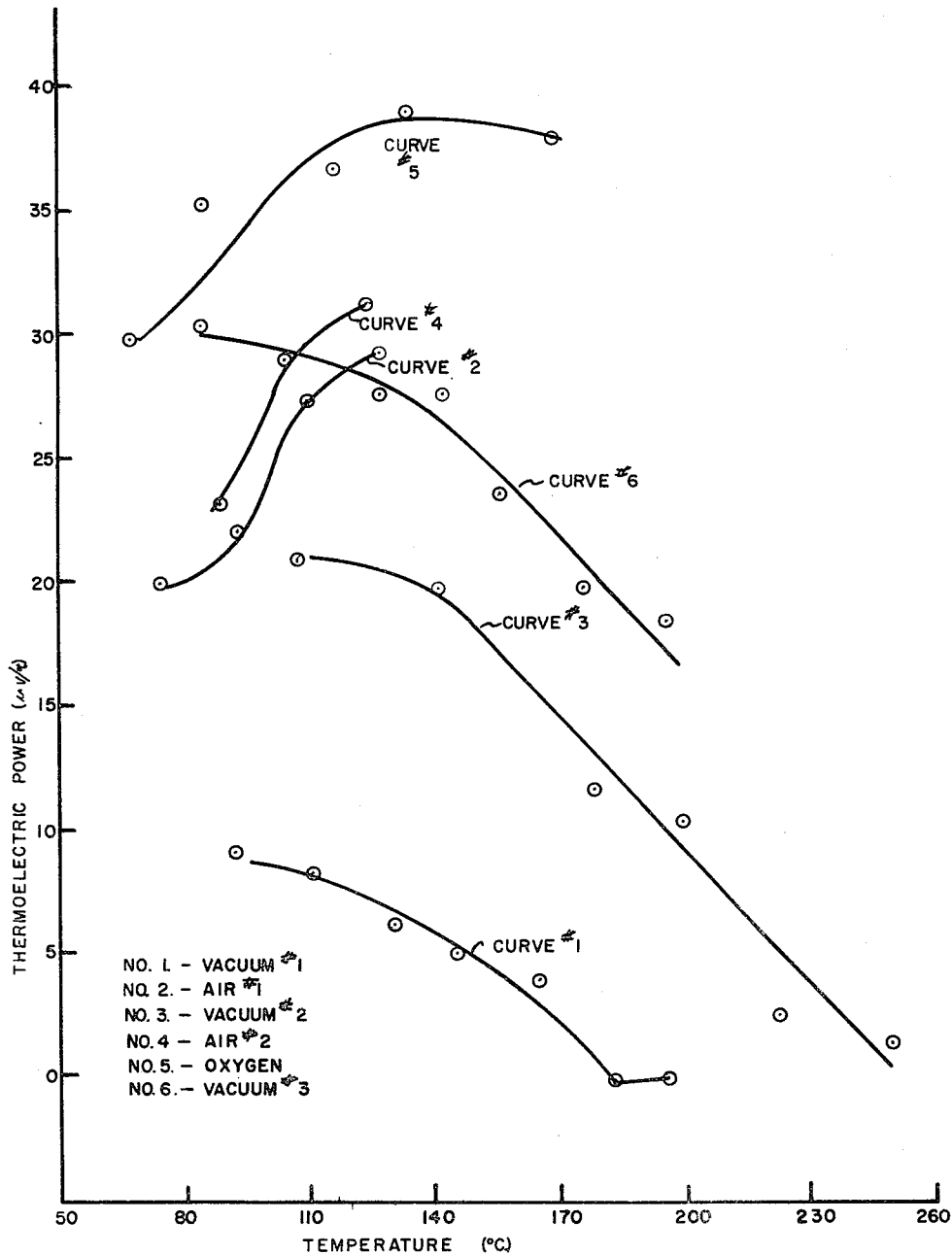

3,142,644
METHOD OF INCREASING THERMOELECTRIC POWER OF PYROLYZED PYROMELLITONITRILE/ALCOHOL REACTION PRODUCT
John E. Katon, Dayton, Ohio, assignor to Monsanto Company, a corporation of Delaware
Filed Dec. 22 1960, Ser. No. 77,563
4 Claims. (Cl. 252—62.3)

The invention relates to a new method of improving the thermoelectric properties of pyrolyzed pyromellitonitrile/alcohol reaction products by oxygen treatment at elevated temperatures.

In copending application Serial No. 11,897, filed February 29, 1960, pyrolyzed pyromellitonitrile/alcohol reaction products and the method of making them are described, and in copending application Serial No. 11,717, filed February 29, 1960, now U.S. 3,060,253, are described thermoelectric devices using as components pyrolyzed pyromellitonitrile/alcohol reaction product bodies.

A new method has now been discovered for improving the thermoelectric power of P-type pyrolyzed pyromellitonitrile lower alkyl alcohol reaction products. Lower alkyl is defined as 1 to 6 carbon atoms. The reaction products result from the reaction of substantially 2 moles of alcohol with one mole of pyromellitonitrile. Pyrolysis is carried out in the presence of an inert atmosphere, e.g. in vacuum at temperature in the range of 200–700° C., preferably at temperatures above about 400° C. and more preferably above about 450° C. More details of the formation of the reaction products and the pyrolyzed reaction products are found in the two copending applications referred to hereinabove. This new method involved the oxygen treatment of these reaction products at elevated temperatures.

It is an object of this invention to provide a new and improved method for upgrading the thermoelectric power of P-type pyrolyzed pyromellitonitrile/alcohol reaction products.

These and other objects of the invention will become apparent as the detailed description of the invention proceeds.

The method of the invention involves treating P-type alcohol/pyromellitonitrile reaction products either in powdered or pellet form with oxygen, i.e. pure oxygen, and oxygen-containing gases such as air or ozone at elevated temperatures of about 50° C. to about 500° C., preferably about 75° C. to about 200° C. for a time sufficient to substantially increase the thermoelectric properties. Actually higher temperatures than 500° C. can be used but treatment time at these higher temperatures must be very short in order to avoid completely carbonizing the material and destroying its thermoelectric properties—the higher the temperature of treatment the shorter the time necessary to obtain a certain increased thermoelectric power. Times of treatment will vary from about 10 minutes to 12 hours at high temperature of the order of 500° C. or higher and from about 1 day to a month or more at low temperatures of the order of 100° C. or lower. Not as long a time of treatment is required with oxygen or ozone as compared to treatment with air to acquire the same amount of increased thermoelectric power. The oxygen for treatment of the P-type alcohol/pyromellitonitrile reaction products can even be provided by materials which decompose to give-off oxygen, e.g. by mixing or treating the reaction products with a peroxide such as benzoyl peroxide. In any event the reaction products are heated at elevated temperatures for a time sufficient to substantially increase the thermoelectric properties of the products.

The invention will be more clearly understood from the following detailed description of specific examples thereof read in conjunction with the accompanying drawing which is a graph showing a family of curves representing various types of treatment of a pellet of pyrolyzed methanol/pyromellitonitrile reaction product with temperatures of treatment being plotted as abscissas and thermoelectric powers as ordinates.

*Example 1*

This example describes the preparation of a pellet of pyromellitonitrile/methanol reaction product and pyrolysis of the pellet to upgrade its thermoelectric properties. A sample of 30 g. of pyromellitonitrile and 4 pints of absolute methanol were refluxed for 24 hours. The solution became dark-blue in color. The solution was filtered hot and a small amount of solid was removed and discarded. The greenish-yellow filtrate was cooled in an ice bath and filtered to recover a light greenish-yellow solid. This solid product weighing 17.35 g. does not melt but starts to change color at 145–155° C., turns black-greenish at 160–165° C. and by 200° C. has turned purplish-black. These observations of color change on heating material were carried out on only a small sample of the material. A sample of 16.2 g. of the 17.35 g. of material was subjected to sublimation treatment at 265° C./0.8–0.2 mm. of Hg absolute pressure for 18 hours. The weight of non-sublimable residue material recovered after sublimation treatment was 12.3 g. A sample of this non-sublimable residue was pressed in a ½" diameter die using 20,000 pounds force to form a pellet having the thickness of about 0.325". This pellet was then heat treated as follows: 300° C. for 24 hours, 400° C. for 24 hours, 500° C. for 24 hours and 600° C. for 24 hours all at 0.1–0.2 mm. of Hg absolute pressure. The weight of the pellet before heat treatment was 1.6317 g. and after heat treatment was 1.2455 g., i.e. a weight loss of 23.6% as a result of heat treatment.

*Example 2*

This example describes the oxygen treatment of the pellet of Example 1 and thermoelectric power measurements of the pellet. Two thermocouple wells were drilled in the pellet, one near the upper surface of the pellet and the other near the lower surface, the two wells being spaced 0.200" apart and being drilled into the edge of the pellet to a depth of 0.250". Before mounting the pellet in the treatment cell thermoelectric measurements were made on the sample using a hot probe and $\Delta T$ of 83° C. The determined thermoelectric power was +22 microvolts/° C. The pellet was then mounted in a cell where the atmosphere surrounding the pellet could be controlled and the thermoelectric measurements could be made by copper/constantin thermocouples.

The first series of measurements at various temperatures were made with the sample under high vacuum of the order of about 0.5 mm. of Hg. In this series of runs the bottom side of the sample was heated and the thermocouples measured the differential temperature for thermoelectric power determinations. The temperature shown below in the tables is the average temperature of the two thermocouple readings. The thermoelectric power generated was measured by connecting the copper leads of the two thermocouples to a potentiometer and balancing the voltage obtained with a standard cell and a calibrated resistor, giving sufficient information to calculate the thermoelectric power of the sample. In the table below are shown the number of hours the pellets were maintained at a certain temperature including heating up time and the thermoelectric power of the pellet determined at the end of this period of time. The following is a summary of the data from this vacuum run.

| Time, hrs. | Temperature, °C. | TEP,[1] μv./°C. |
|---|---|---|
| 18½ | 92.6 | +8.7 |
| 23 | 113.9 | +8.1 |
| 41 | 130.4 | +5.8 |
| 65 | 144.5 | +4.9 |
| 70 | 165.0 | +3.7 |
| 88 | 182.8 | −0.9 |
| 93 | 194.5 | −0.6 |

[1] TEP means thermoelectric power.

In the data above it is seen that some samples are labeled plus and some minus thermoelectric power. This is an indication as to whether the sample has P-type or N-type conductivity with the plus indicating the P-type and the minus indicating the N-type. The times shown in hours are cumulative, i.e. 18½ hours were used to heat the sample up to and hold it at 92.6° C. before the thermoelectric power measurement. Then the temperature applied to the bottom of the pellet was increased and at the end of 4½ hours the thermoelectric power was measured at 113.9° C., etc. As was previously stated the temperature reported is the average of the two thermocouple readings.

At the end of the vacuum run, after the sample had been allowed to cool the sample cell was opened to the air. Then another series of heating the pellet from the bottom in steps for various length of time began with air surrounding the sample. The results of this series of tests is reported in the table below. The measurements were carried out in the same manner as were the measurements for the vacuum run above. The data are as follows:

| Time, hrs. | Temperature, °C. | TEP,[1] μv./°C. |
|---|---|---|
| 4 | 74.6 | +19.9 |
| 7 | 93.8 | +21.8 |
| 24 | 110.1 | +27.2 |
| 28 | 127.1 | +28.1 |

After this first run in air a second run was made in vacuum and the results of this vacuum run are reported in the following table.

| Time, hrs. | Temperature, °C. | TEP,[1] μv./°C. |
|---|---|---|
| 24 | 108.0 | +21.0 |
| 28¼ | 141.1 | +19.7 |
| 51¼ | 179.2 | +11.6 |
| 54¾ | 199.7 | +10.5 |
| 71¾ | 223.4 | +2.1 |
| 74¾ | 249.4 | +1.0 |

Next a second run in air was made with measurements and calculations being made in a similar manner to the other runs. The data is summarized in the table below.

| Time, hrs. | Temperature, °C. | TEP,[1] μv./°C. |
|---|---|---|
| 4 | 87.5 | +23.2 |
| 27½ | 107.9 | +29.6 |
| 31½ | 122.5 | +31.1 |

After completing the second run in air instead of making another vacuum run, a run was made with the sample surrounded by an atmosphere of oxygen. A slight positive pressure was maintained in the sample cell feeding into the cell from an oxygen cylinder. The data for the oxygen run is shown in the following table.

| Time, hrs. | Temperature, °C. | TEP,[1] μv./°C. |
|---|---|---|
| 3¼ | 66 | +39.8 |
| 20¼ | 87 | +35.0 |
| 24¾ | 117 | +36.7 |
| 43¾ | 133 | +39.0 |
| 47½ | 168 | +38.1 |

To complete the series of runs after the oxygen run a third run under vacuum was made and this run is summarized in the table below.

| Time, hrs. | Temperature, °C. | TEP,[1] μv./°C. |
|---|---|---|
| 5½ | 84.9 | +30.2 |
| 28¾ | 105.6 | +29.0 |
| 48¼ | 126.7 | +27.9 |
| 53 | 143.1 | +28.5 |
| 77 | 156.2 | +23.8 |
| 96 | 176.5 | +19.9 |
| 100 | 197.0 | +18.6 |

The six runs described above are summarized in a semi-quantitative fashion in the figure wherein temperatures are plotted as abscissas and thermoelectric power as ordinates to give the six curves representing the six runs. It is readily apparent from an examination of the curves that oxygen treatment of pyrolyzed methanol/pyromellitonitrile reaction products of P-type conductivity increases the thermoelectric power thereof when the treatment is carried out at elevated temperatures. The curves of the figure are plotted from the data of Example 2 and represent in the same order as the curves are numbered the six runs beginning with the first vacuum run.

An alternative method of making the improved oxygen-treated pyrolyzed pyromellitonitrile/lower alkyl alcohol reaction products is to pyrolyze the products in the presence of oxygen. In such an alternative process much shorter pyrolysis times should be used at high temperatures to avoid completely carbonizing the material and destroying its thermoelectric properties.

The oxygen-treated pyrolyzed pyromellitonitrile/lower alkyl alcohol reaction products of this invention can be employed as the pyrolyzed pyromellitonitrile/alcohol reaction product bodies in the thermoelectric devices disclosed in copending application Serial No. 11,717, filed February 29, 1960, the disclosure of which is hereby incorporated herein by reference.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly modifications are contemplated which can be made without departing from the spirit of the described invention.

What is claimed is:

1. A method for improving the thermoelectric properties of P-type pyrolyzed reaction product, said pyrolyzed reaction product being made by the process comprising: (1) heating at at least reflux temperature a mixture of pyromellitonitrile and a lower alkyl alcohol to form a reaction product having substantially 2 moles of alcohol per mole of pyromellitonitrile, (2) separating the reaction product of step 1 from the reaction mixture, and (3) heating in an inert atmosphere the reaction product separated in step 2 at a temperature in the range of about 200–700° C. for a time sufficient to produce the desired thermoelectric properties, comprising heating said pyrolyzed reaction products prior to use in a thermoelectric device in the presence of free oxygen at sufficiently elevated temperatures in the range of about 50 to about 500° C. for a period of time sufficient to substantially increase the thermoelectric power of said pyrolyzed product.

2. The method of claim 1 wherein said alcohol is methanol.

3. The method of claim 1 wherein the reaction product separated in step 2 is formed into a pellet under pressure prior to step 3.

4. The method of claim 3 wherein said alcohol is methanol.

References Cited in the file of this patent

Berkmann: "The Chemistry of Acetylene and Related Compounds" (1948), page 80.